United States Patent [19]
Perrenoud, Jr.

[11] Patent Number: 5,180,028
[45] Date of Patent: Jan. 19, 1993

[54] TRACTOR IMPLEMENT ORIENTATION SYSTEM

[76] Inventor: Stephen A. Perrenoud, Jr., Rte. 4, Box 58, Chippewa Falls, Wis. 54729

[21] Appl. No.: 638,385

[22] Filed: Jan. 7, 1991

[51] Int. Cl.⁵ .................................. B60K 17/358
[52] U.S. Cl. .................. 180/235; 180/134; 180/41; 280/6.12; 280/492
[58] Field of Search .......... 180/235, 134, 41; 280/6.11, 6.12, 6.1, 426, 468, 467, 98, DIG. 1, 492

[56] References Cited

U.S. PATENT DOCUMENTS

| | | | |
|---|---|---|---|
| 2,788,139 | 4/1957 | Tendresse | 280/6.12 |
| 2,788,143 | 4/1957 | Tendresse | 414/739 |
| 3,312,301 | 4/1967 | Hagen | 180/139 |
| 3,411,809 | 11/1968 | Kampert et al. | 280/400 |
| 3,687,227 | 8/1972 | Reuter et al. | 180/41 |
| 3,789,943 | 2/1974 | Kampert et al. | 180/54.1 |
| 3,831,693 | 8/1974 | King | 280/492 X |
| 3,953,040 | 4/1976 | Unruh et al. | 280/6.12 |
| 3,976,302 | 8/1976 | Hammarstrand | 280/6.12 |
| 4,147,263 | 4/1979 | Frederick et al. | 414/718 |
| 4,236,591 | 12/1980 | Molby | 280/6.12 X |
| 4,290,622 | 9/1981 | Horvath | 280/492 X |
| 4,382,604 | 5/1983 | Nakagawa | 280/6.12 |
| 4,506,792 | 3/1985 | Hedlund et al. | 280/492 X |
| 4,507,797 | 4/1986 | Ericsson | 280/6.12 |
| 4,512,589 | 4/1985 | Ambrose et al. | 280/840 |
| 4,564,214 | 1/1986 | Tokunaga et al. | 280/707 |
| 4,650,017 | 3/1987 | Pelletier et al. | 180/9.1 |
| 4,669,566 | 6/1987 | Bergius et al. | 180/139 |
| 4,696,152 | 9/1987 | Kinzenbaw | 56/209 |

Primary Examiner—Charles A. Marmor
Assistant Examiner—Kevin Hurley
Attorney, Agent, or Firm—Robert C. Baker

[57] ABSTRACT

This self-propelled articulation-steered tractor has a positive adjustment system for controlling the orientation (both elevation and lateral tilt) of a transverse implement mounted on either the front or rear assembly of the tractor, and a reactive adjustment system for allowing terrain-responsive orientation of the axle of the other assembly (front or rear) not carrying the transverse implement. The positive adjustment system is operator controlled. The reactive system may comprise a mounting of the axle for the non-implement-carrying assembly so it freely pivots with respect to the frame of that assembly. An articulation joint transverse swivel pivot system is provided for lateral tilt movement between the front and rear assemblies of the articulation-steered tractor.

32 Claims, 5 Drawing Sheets

TRACTOR IMPLEMENT ORIENTATION SYSTEM

BACKGROUND OF THE INVENTION

This invention relates generally to the field of articulated vehicular equipment, and more particularly to an articulated tractor equipped with a novel implement orientation system permitting new versatility for active and effective operator-controlled implement positioning and articulated tractor implement operation independently of the lay of terrain traversed by the tractor. The invention also relates to a new method for orienting an implement mounted on an articulated tractor.

The present invention allows a articulated tractor to be operated with chassis frame adjustment of the transverse tilt of an implement for active implement operation in confined areas despite the slope or irregularity of the terrain. The invention makes this possible while simultaneously permitting stable and solid unlevel ground support for the wheels of the articulated tractor and while keeping the chassis frame adjustment of the implement orientation under operator control.

Insofar as is known, frame-mounted articulated tractor transverse implements have not heretofore been capable of total operator control of their transverse orientation in a manner completely independent of the lay of the terrain over which the tractor is steered by articulation. This has made it difficult if not impossible to obtain consistent and efficient articulated tractor transverse implement operational results on uneven terrain, especially in areas confining or limiting the range of operation of the articulated tractor itself. A good example of the problem is that of building a level road in uneven terrain between existing obstacles such as between buildings, or building a suitably graded road next to hazards such as along the side of a mountain. Existing articulated tractor machinery is unsatisfactory for tackling such jobs effectively without a multitude of wasted tractor movements. The present invention provides a solution to this vexing problem.

SUMMARY OF THE INVENTION

The self-propelled articulation-steered tractor of this invention is equipped with an implement orientation system controllable by an operator. The tractor has a front assembly and a rear assembly in longitudinal relationship. Each assembly comprises a frame having lateral dimensions and a transverse axle on laterally spaced wheels for supporting the frame. The tractor has a vertical-axis articulation pivot joint linking the frame of the rear assembly to the frame of the front assembly. Articulation turning means is provided for turning the front assembly relative to the rear assembly about the vertical-axis articulation joint to steer the tractor over terrain. A transverse implement is mounted on the frame of one of the tractor assemblies at a location in front of the axle thereof. Further, the tractor is equipped with a positive adjustment system for controlling the orientation of the implement of the one assembly, and a responsive adjustment system for allowing terrain-responsive orientation of the axle of the other assembly not carrying the transverse implement.

The positive adjustment system for the assembly carrying the implement includes several elements that together enable complete operator control of transverse implement orientation. First, this system includes an operator-actuated elevational means extending between the implement-carrying frame and the transverse implement itself. This allows an operator to adjust the vertical elevational orientation of the transverse implement with respect to the terrain. This system also includes a medially located pivot mount structure fixed to the frame of the implement-carrying assembly, and a pivot mount at a medial axle location for mounting the axle in pivotable relationship to the pivot mount structure of the implement-carrying frame. Further, it includes a laterally positioned operator-actuated adjustment means mounted between a lateral location on the implement-carrying frame and a location laterally spaced from the medial location on the axle supporting that frame. This adjustment means allows an operator to adjust the lateral pivot orientation of the implement-carrying frame with respect to its axle and thereby effectively adjust the transverse tilt of the transverse implement with respect to the terrain.

The reactive adjustment system for the other assembly not carrying the implement includes structural means for allowing transverse swivel pivot movement of the axle thereof reactively to, or in response to, the lay of the terrain under the wheels of this other assembly; and this occurs independently of the pivot orientation of the frame carrying the implement.

Thus, the transverse implement is effectively adjustable in orientation to both elevation and transverse tilt in a manner completely independent of the lay of variable terrain as the tractor is supported and is moved on its wheels over such terrain. Adjustment of the implement orientation, both in elevation and in transverse tilt, is accomplished in a manner completely independent of the swivel pivot orientation of the axle of the assembly not carrying the implement, and in a manner completely and exclusively under the control of an operator. All of this is made possible by the invention, while at the same time the invention makes it possible to maintain all wheels of the articulation-steered tractor in stable support relationship on the terrain even when the terrain is irregular.

The invention also provides optional buffer systems for the transverse swivel pivot movement of the axle of the assembly not carrying the implement.

It also provides a novel swivel pivot structure at the articulation joint of the tractor for allowing the swivel pivot movement of the axle of the assembly not carrying the implement. This articulation joint swivel pivot structure optionally may be equipped with a buffering system, and alternatively may be equipped with positive power adjustment means for operator control of the swivel pivot orientation of it.

Still further, the invention provides a new method for the operation of a transverse implement on an articulated tractor. This method comprises propelling apparatus as described over irregular terrain while simultaneously adjusting either the elevation or transverse tilt of the transverse implement, or both, at an operator's discretion and independently of the lay of the terrain.

Still further benefits and advantages and features of the invention will be evident as this description proceeds.

DESCRIPTION OF THE PREFERRED EMBODIMENT

The new tractor implement orientation system is especially useful for front end loader type earthmoving articulation-steered vehicles and will be illustratively described in that application.

As a preliminary matter, however, some reference should be made to the special significance of this invention as applied to articulation-steered tractors. It is well known that articulation-steered tractors are highly maneuverable in confined areas. But such tractors have never heretofore, insofar as is known, permitted total operator control of the adjustment of the transverse tilt of a transverse implement (such as a transverse bucket or scraper) relative to the axle for the frame of the tractor assembly carrying the implement. The result has been that the transverse implement (bucket or scraper) of the articulated tractor inherently has attacked earth at the angle set by the wheel-supported axle for the frame carrying the implement, or at an angle not under operator control. Thus, despite the maneuverability of articulated vehicles, many wasted movements have been required for effective grading in the building of roads in confined areas when using implements as mounted on articulated tractors heretofore.

Figure 1:
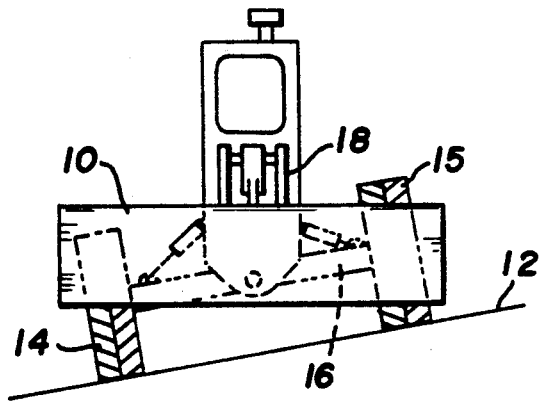
FIG. 1 is a schematic front view of the one assembly of the tractor of the invention carrying the transverse implement, and illustrates an orientation of the transverse implement (and the operator cab) in horizontal condition, with the orientation of the axle of this assembly carrying the implement at an angle for stable wheel support on the sloped terrain.

In this invention, as particularly illustrated in FIG. 1, the transverse implement 10 may be positioned at a transverse tilt angle entirely independent of the lay of terrain 12 traversed by the wheels 14, 15 of the axle 16 for the chassis frame 18 carrying the transverse implement. A transverse implement may desirably in many instances be oriented at a transverse tilt of essentially horizontal character while the wheels supporting the assembly carrying the implement are at an angle of tilt as illustrated in FIG. 1. However, it must also be recognized that it is sometimes useful to tilt the implement to form a trench while the wheels of the tractor are on level ground. Further, as an operator moves along a slope of a hill or mountain, gouging out more and more of the earth, the terrain over which the tractor is moved may have bumps and variations caused by circumstances beyond the control of an operator (or variations caused by an operator), with the result that the wheels of the axle of the frame supporting the implement may not always remain at the same angular slope as the tractor is moved along. Because the orientation of the implement according to the teachings of this invention is totally under operator control, and adjustable both in elevation and in angular tilt as the articulated tractor is moved over the earth or terrain, delays associated with continual repositioning of the articulated equipment to effect desired earth moving are avoided. In essence, this invention adds to the already significant benefits of maneuverability for articulated equipment by providing that equipment with operator-controlled implement adjustability in tilt and elevation as the equipment moves along, thereby reducing needed movements of the equipment, and commensurately reducing consumption of fuel, for accomplishing a particular earthmoving job.

Figure 2:
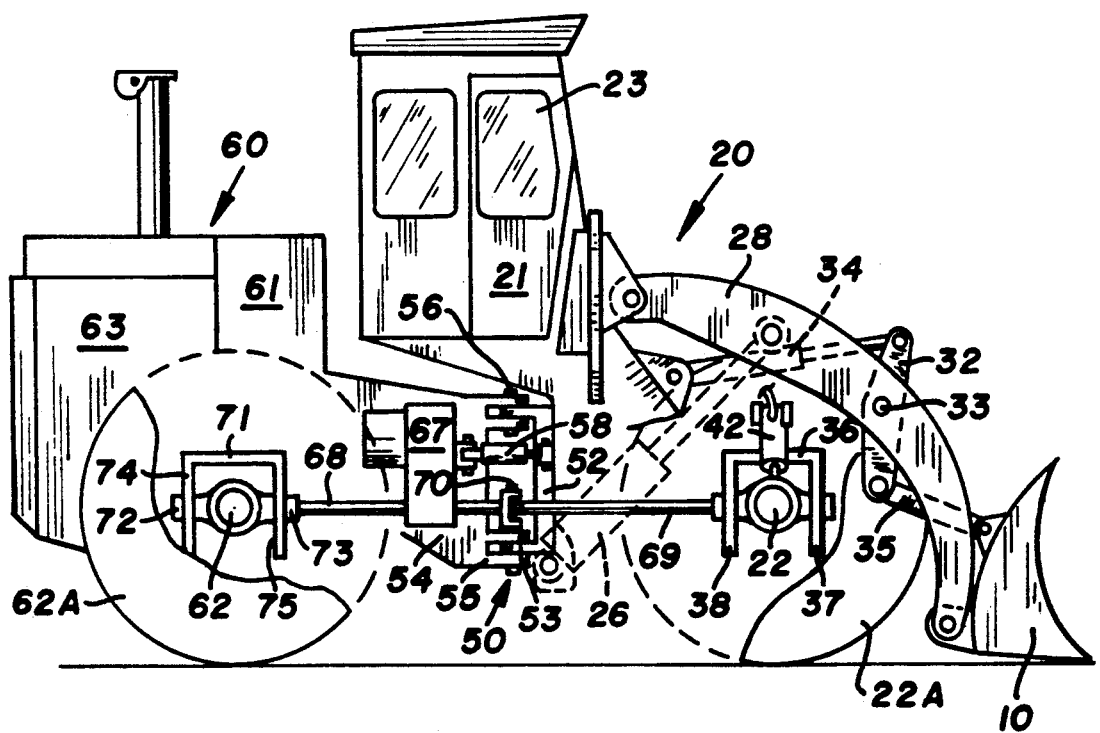
FIG. 2 is a schematic side elevation view, with some parts removed or broken away and some shown in phantom, of an articulated tractor (front end loader type) having its front assembly equipped with the implement orientation system of the invention.
Figure 3:
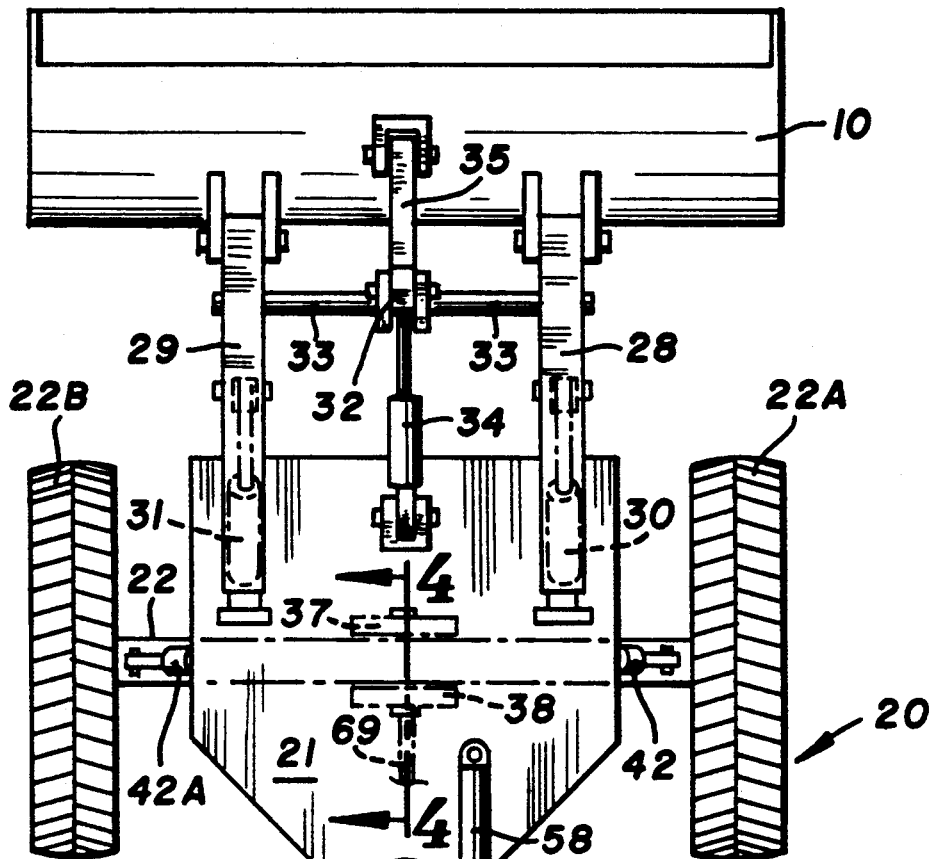
FIG. 3 is a schematic top plan view of the apparatus of FIG. 2, again with some parts removed or broken away.
Figure 3:
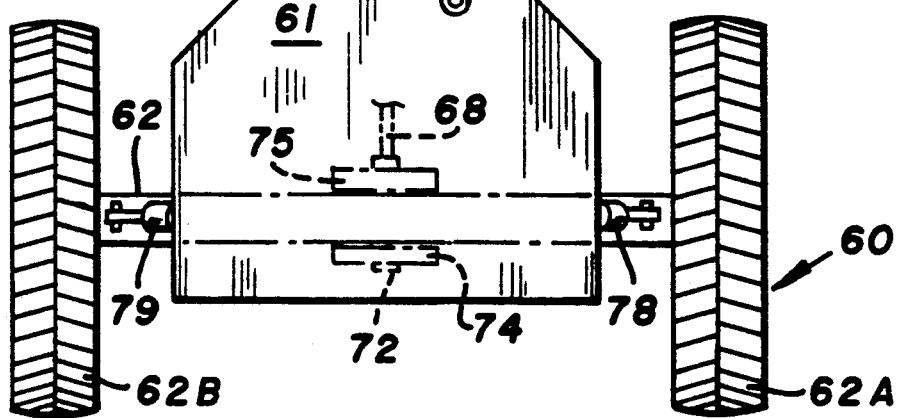

Referring now particularly to FIGS. 2 and 3, the basic arrangement of elements in an articulation-steered tractor comprises a front assembly 20 and a rear assembly 60 in longitudinal relationship, that is, one in front of the other. The normal (non-turned) condition of the assemblies is assumed; thus, the longitudinal axis of the tractor can be defined as a vertical plane dividing or bisecting the tractor assemblies into left and right halves. A horizontal line in the vertical plane extends in the longitudinal direction of the tractor.

Both the front assembly 20 and the rear assembly 60 have certain common elements, namely a frame 21, 61 having lateral or transverse dimensions, and a transverse axle 22, 62 for supporting the frame, and laterally spaced wheels (22A, 22B, and 62A, 62B) supporting the axle. Each frame 21, 61 may be considered a chassis. The frame 21 of the front assembly 20 suitably includes the cab 23 for the operator and wherein the operator controls are located. The frame 61 of the rear assembly 60 normally will include the motive power means 63 or engine for making the articulated tractor self-propelling through a gear box 67 and drive shafts 68, 69 connected at a universal joint 70.

The tractor has a vertical-axis articulation pivot joint 50 at its waist portion. This joint links the frame 61 of the rear assembly 60 to the frame 21 of the front assembly 20. Illustratively the articulation joint 50 may comprise a hinge formed by a vertically oriented U-shaped connector member 52 mounted on the front frame 21 and a vertically oriented U-shaped connector member 54 mounted on the rear frame 61. Each U-shaped member forms ears or arms projecting from the base of the U-shape, and the ears are connected together by a pin means 56 for pivot articulation at a medial location between the front and rear assemblies. Any suitable means may be employed for turning the front assembly with respect to the rear assembly about the vertical articulation joint 50 for steering the tractor over terrain. Illustratively, a hydraulic cylinder and ram combination 58 pivotally mounted at its end to the front 21 and rear 61 frames at a lateral side of the articulation joint provides the force for steering purposes. Usually, such a hydraulic cylinder and ram combination will be mounted on each lateral side of the articulation joint. Extension of the ram of one and retraction of the ram of the other effectively turns the front assembly 20 with respect to the rear assembly 60 about the vertical articulation joint 50 so as to effect steering of the tractor in a known manner.

A transverse implement 10 such as a scraper blade or bucket is mounted on the frame of one of the assemblies at a location in front of the axle thereof In the illustrated embodiment of a front end loader, this transverse implement 10 is mounted in front of the axle 22 of the front assembly 20.

The next important feature of the invention to be discussed are the positive adjustment system for the assembly 20 carrying the implement 10 and the reactive adjustment system for the other assembly 60.

The positive adjustment system for the front assembly 20 (which illustratively carries the implement 10) has an operator-actuated elevational means extending between the frame 21 and the transverse implement 10 for adjusting the vertical orientation of the transverse implement with respect to the terrain. Illustratively, such elevational means may comprise laterally spaced boom arms 28, 29 pivotally mounted at one end to the frame 21 and pivotally mounted at the other to the transverse implement or bucket 10. These boom arms are further supported and also made adjustable by laterally spaced hydraulic cylinder and ram combinations 30, 31 pivotally mounted at one end to frame 21 and pivotally mounted at their opposite ends to boom arms 28, 29 in a known manner. The arrangement is such that hydraulic extension and retraction of the ram of the cylinder-ram combinations effectively elevates and lowers the transverse implement 10. Controlling the attack angle of the transverse implement is a linkage suitably extending from a medial location on the front frame 21 to a medial location on the transverse implement 10. Illustratively, a bell crank 32 is mounted on a shaft rotatably journaled at its opposite ends in boom arms 28, 29 at a location preferably between the end of the boom arms pivotally mounted to the transverse implement 10 and the end of the boom arms pivotally mounted on the frame 21. One end of the bell crank is pivotally attached to one end of a medially extending hydraulic cylinder and ram combination 34 which at its other end is pivotally attached to the frame 21. The opposite end (lower end) of the bell crank 32 carries a pivot attachment of an arm 35 that extends and is pivotally attached to the transverse implement 10 at a location preferably above the level of the pivotal attachment of the boom arms to that implement. Thus, extension and retraction of the medial hydraulic cylinder and ram combination 34 adjusts the attack angle of the transverse implement in vertical planes perpendicular to its transverse extension. The extension and retraction of the hydraulic cylinder and ram combinations 30, 31 for elevating and lowering the boom arms and therefore elevating and lowering the transverse implement 10, as well as the extension and retraction of combination 34 for adjusting the attack angle of the implement in vertical planes perpendicular to its transverse direction, are accomplished by an operator through controls in the cab of the tractor, as well known.

New to the art, however, are some features that function in combination with the aforenoted operator-actuated elevational means to provide complete operator control of not only the elevation but also the sideways or transverse angular tilt of the transverse implement.

Figure 4:
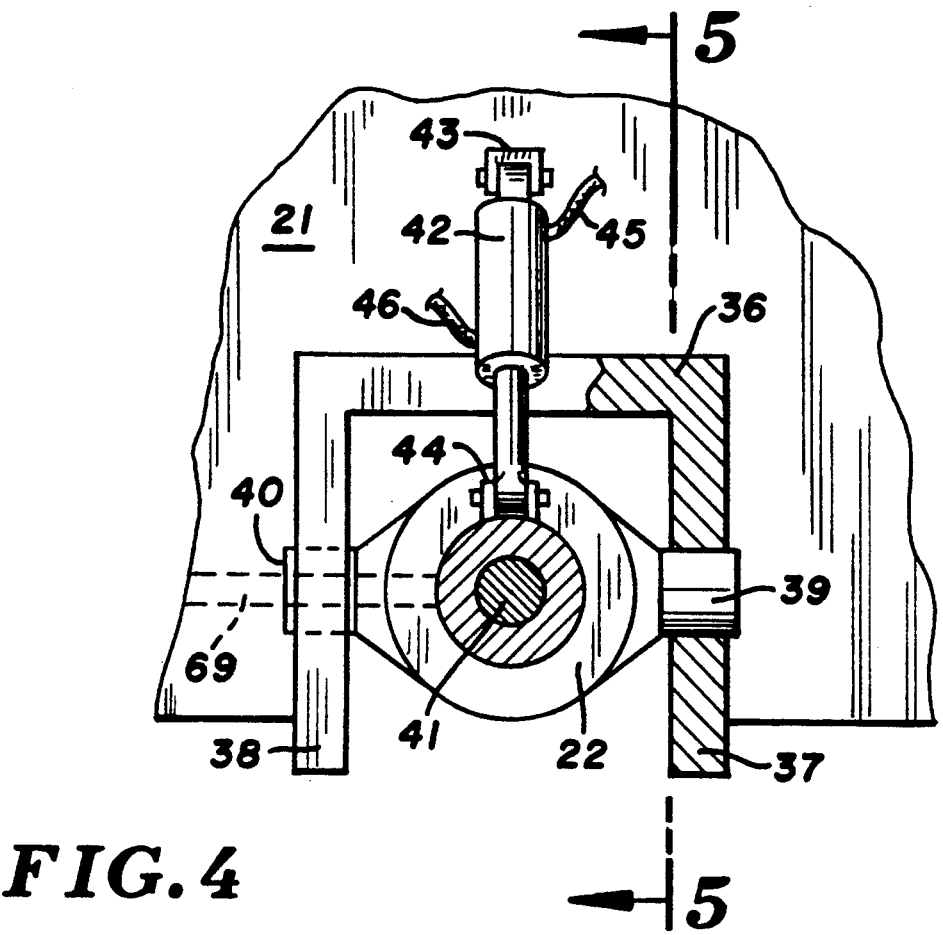
FIG. 4 is a schematic sectional view, taken on line 4—4 of FIG. 3, illustrating the positive adjustment frame-axle pivot structure of the front assembly of the tractor (i.e., the assembly illustrated in FIG. 2 as carrying the transverse implement), with parts broken away.
Figure 5:
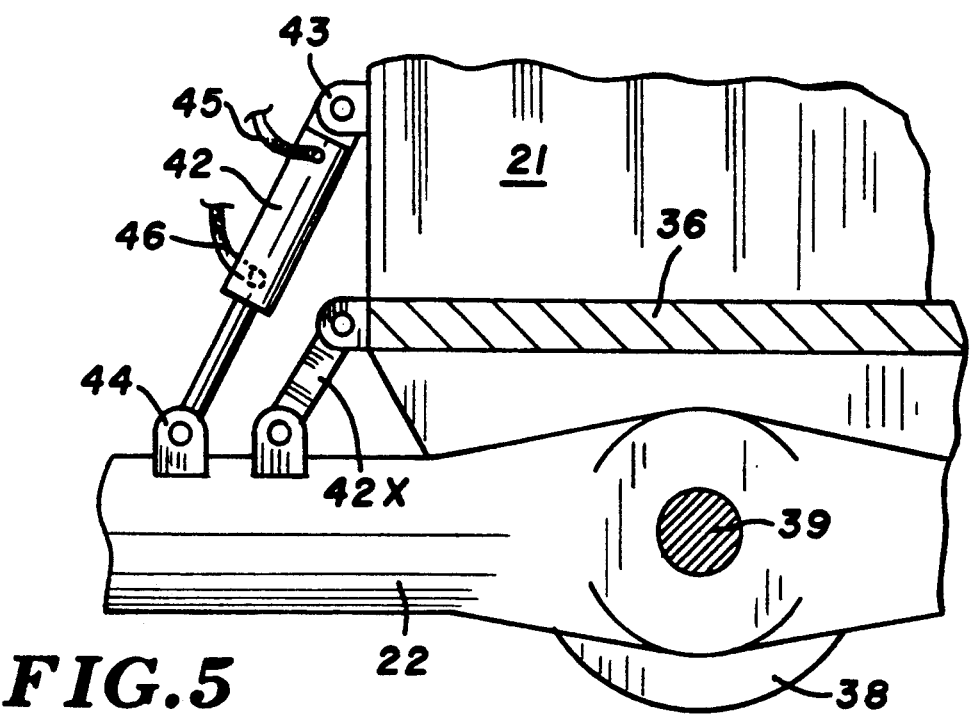
FIG. 5 is a schematic sectional view taken on line 5—5 of FIG. 4.

FIGS. 4 and 5 show particularly (and FIGS. 2 and 3 show generally) the operator-actuated adjustment means for effecting the positive adjustment of the angularity of the transverse tilt of the transverse implement 10. This adjustment means first requires a medially located pivot mount structure 36 fixed to the underside of the front or first chassis frame 21 of the implement-carrying assembly 20. The pivot mount structure 36 suitably somewhat resembles an inverted U-shape channel with its channel legs in depending orientation and forming parallel ears 37, 38 oriented transversely to the longitudinal alignment of the front frame 21. The ears 37, 38 contain centrally located pivot mount bearing recesses or openings in which longitudinally aligned pivot stub shafts 39, 40 are journaled. Pivot stub shaft 40 is sleeve-like and receives drive shaft 69 that, through gearing, turns the rotary drive 41 within axle 22 for propelling the front wheels 22A and 22B. The pivot stub shafts are integral and perpendicular to the axle 22 of the implement-carrying assembly. They function as a pivot mount at a medial location on axle 22 and extend forward and rearward of the medial portion of the axle 22, suitably and preferably along the longitudinal axis of the front assembly 20 of the tractor.

An operator-actuated positive adjustment means 42 is provided for adjusting the lateral pivot orientation of the frame 21 of the implement-carrying assembly 20 with respect to the axle 22 of that assembly so as to effect adjustment of the transverse tilt of the transverse implement 10 mounted on the frame and thereby change that transverse tilt of the implement with respect to the terrain. Suitable operator-actuated tilt adjustment means may comprise a laterally positioned hydraulic cylinder and ram combination 42. Such hydraulic means is mounted at lateral locations from the longitudinal axis of pivot for stub shafts 39 and 40. Opposite ends of the hydraulic cylinder and ram combination 42 are pivotally mounted. One end is pivotally mounted at ears 43 on the frame 21 at a lateral location from the pivot mount structure 36. The other end is pivotally mounted on ears 44 on the axle at a lateral location from pivot mount structure 36 and on the same lateral side as the pivot mounting for the first end 43 of the adjustment means 42. While a single operator-actuated adjustment means 42 may be employed at a lateral location with respect to the pivot mount structure or the axis of pivot for the axle 22, it is preferable to employ such hydraulic means at a lateral location on each side of the pivot for the axle. It is emphasized, however, that although hydraulic means are preferred, the use of chains, gears, cables and various other operator-actuatable adjustment means of a mechanical nature (linked between frame 21 and axle 22) present options contemplated by the invention. Hydraulic power may be replaced by vacuum or electrical power, depending on the mechanical means employed for effecting the tilt adjustment.

Figure 6:
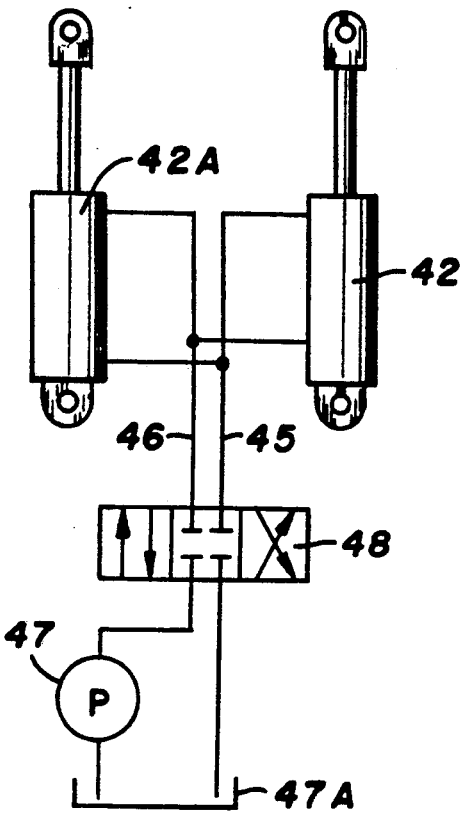
FIG. 6 is a diagram illustrating a circuit for hydraulic means for positive adjustment of the frame-axle pivot structure of the assembly of the tractor carrying the transverse implement; a similar hydraulic circuit may be used for operator control of the degree of swivel pivot at articulation joints equipped with a structure such as illustrated in FIGS. 8, 9, and 10.

Referring to FIGS. 5 and 6, the hoses or fluid conduits 45 and 46 for hydraulic means 42 connect to a valving system and then to a reservoir and pump as customary. FIG. 6 diagrammatically illustrates the control circuit for the hydraulic system as described for the axle 22 and frame 21 of the implement-carrying assembly 20. Hydraulic fluid is pressurized by a pump 47 powered by any suitable power means of the tractor; and that pressurized fluid passes through valve 48 controlled by an operator by a control lever 49 (see FIG. 7) to appropriate chambers in the hydraulic combinations 42 and 42A. The hydraulic cylinder and ram combinations 42 and 42A simultaneously act but in opposite motion, i.e., as the hydraulic ram of one combination 42 withdraws into its cylinder, the hydraulic ram of the other 42A is expelled or extended out of its cylinder. Thus each combination 42 and 42A functions to effect the tilt of the frame 21 with respect to axle 22. The operator controls this using a three-position valve 48 of conventional design that diverts fluid from the pump 47 to a specific hydraulic fluid line 45 or 46 into the hydraulic circuit and from the circuit to the low pressure hydraulic reservoir 47A. Should the operator desire to tilt the transverse implement 10 to, for example, the left (with the left lateral side of the transverse implement a viewed in FIG. 3 shifted relatively in a downward direction compared to the right lateral side of that implement), the control lever is moved to a left-hand position by the operator until the desired angle of tilt of frame 21 carrying the implement 10 is achieved. Then the control lever is returned to its central and neutral position that blocks the fluid communication in the hydraulic lines. A left tilt of the control lever effectively allows high pressured fluid to move through line 45 to the bottom of the hydraulic cylinder 42, thereby expelling its ram, and to the top of cylinder 42A, thereby retracting its ram. Hydraulic fluid on the opposite side of the ram ends or pistons within the cylinder is simultaneously expelled back to the reservoir through line 45. An operator's movement of the control lever to the right, for depressing the right lateral side of the transverse implement (by pulling the right side of axle 22 and the right side of frame 21 toward each other) effectively reverses the flow of fluid so as to effect retraction of the ram of the right cylinder 42 and extension of the ram outwardly from the left cylinder 42A.

It is entirely possible, if desired, to incorporate the control for elevation of the implement 10 with the control for effecting lateral tilt of the implement, so as to provide an operator with a single lever control whereby forward and rearward movement of the lever would adjust the elevation and sideways movement would adjust the lateral tilt of the implement 10.

In the event of hydraulic failure that might disable the pivot adjustment means for the implement-carrying frame 21 and thereby disable pivot adjustment for the transverse tilt angularity of the implement 10 itself, or in the event pivot adjustment for the implement is undesired as the articulated tractor is self-propelled from one working site to another, a locking means 42X for preventing pivot shift of the axle 22 supporting the implement-carrying frame 21 is optionally provided. Such a locking means is illustrated in FIG. 5 and suitably comprises a removable locking arm 42X having pin receiving holes at its opposite ends. An operator, at discretion, fixedly mounts locking arm 42X at opposite ends to a lateral location on the axle 22 and frame 21. The mounting of opposite ends of the locking arm 42X may be accomplished by using removable pins at ear mounts on the axle 22 and frame 21. To be stressed is the fact that locking arm 42X is removed from its illustrated position in FIG. 5 for normal operation of the positive adjustment system for controlling the transverse tilt of the implement 10.

Now to be discussed is the reactive adjustment system for the assembly (e.g., the rear assembly 60) not carrying the transverse implement 10. This system is characterized by having structural means for allowing transverse swivel pivot movement of the axle 62 of that assembly 60 reactively to the lay of the terrain over which the wheels 62A and 62B of it traverse. The pivot orientation of the frame and axle of the implement-carrying front assembly 20 has no positive controlling effect whatsoever on the pivot orientation of the axle 61 of the rear assembly 60 not carrying the implement. Thus, the reactive adjustment system is quite independent from the positive adjustment system for the implement-carrying assembly, but effectively compensates for terrain irregularity and thus acts in cooperation with the positive adjustment system in the operation of the articulated tractor FIG. 2 illustrates the most simple structure for the reactive adjustment system for pivot of the axle 62 It is emphasized that axle 62 (i.e., the axle of the frame not carrying the implement 10) is an oscillating or floating or rocking or swinging axle. It is not positively controlled by an operator in its tilt. The reactive system is completely comparable to the positive adjustment system detailed in FIGS. 4 and 5, except that, in the most simple reactive adjustment system, the operator-controlled positive adjustment hydraulic means 42 is omitted (and, of course, locking arm 42X is likewise omitted or at least removed from locking position).

Specifically, as illustrated in FIG. 2, a medially located pivot mount structure 71 is fixed to the underside of the frame 61 of the rear assembly 60. This pivot mount structure is suitably identical to the U-shaped pivot mount structure discussed for the front frame 21 illustrated in FIGS. 4 and 5. Similarly, the pivot mount on the axle 62 is at a medial location on the axle and suitably consists of stub shafts 72 and 73 journaled in bearing recesses in the U-shaped channel legs 74 and 75 of pivot mount structure 71, just as discussed above for the stub shafts 39 and 40 illustrated in FIGS. 4 and 5. Stub shaft 73 is sleeve-like and comparable to stub shaft 40 of FIG. 4 in that it receives drive shaft 68 for transmission of propelling power to wheels 62A and 62B. The result of this arrangement at the rear axle 62 and its pivot mounting to rear frame 61 is that frame 61 and axle 62 swivel pivot laterally with respect to each other, and freely do so.

No hydraulic cylinders o other positive adjustment means are employed in this most simple structural arrangement for a pivotable axle for the rear frame 61. Thus the axle 62 for the rear assembly 60 is allowed to pivot reactively to the lay of the terrain under the wheels 62A and 62B of this assembly and is allowed to do so independently of the pivot orientation of the frame 21 carrying implement 10. Further, in this most simple structural arrangement for reactive pivot orientation for the axle 62, no structure is present for allowing transverse pivot movement of the frame 61 of the rear assembly 60 relative to the frame 21 of the front assembly 20. In this simple arrangement, the front frame 21 and rear frame 61 assume the same tilt; torsional forces of tilt for one frame are carried through to the other.

More preferred, however, is to employ a structural arrangement as just described for the axle 62 of the rear assembly 60 plus a buffering hydraulic system for dampening (or shock absorbing) the transverse swivel pivot movement of that axle. A suitable buffering system will be described by reference to FIG. 11, and comprises hydraulic cylinder and ram combinations 78 and 79 laterally mounted between the frame 61 and axle 62 in a manner a illustrated in FIG. 5 for the lateral mounting of the hydraulic cylinder and ram combination 42 of the positive adjustment system for tilt of the axle 22 relative to frame 21. However, the circuit illustrated in FIG. 6 for the combination 42 is not used in buffering. Instead, the buffering hydraulic cylinder and ram combinations 78 and 79 are so connected as to form a closed hydraulic system as distinguished from the hydraulic system illustrated in FIG. 6. The most simple of closed hydraulic systems (see FIG. 11) is formed with a conduit connection 80 and 81 between the ram side of hydraulic cylinder 78 and the piston side of the hydraulic cylinder 79, and another conduit connection 82 and 83 between the piston side of cylinder 78 and the ram side of cylinder 79. These conduit connections pass through a valve 84, so as to allow cross flow between the upper or ram side of one hydraulic cylinder to the piston side of the other, and vice versa, as the ram of one is extended and the ram of the other is contracted or withdrawn into the cylinder. In this manner, the axle of the rear assembly 60 is allowed to freely pivot at its pivot mount, but the pivot movement is somewhat dampened or buffered. Further, valve 84 in the transfer conduits between the cylinders 78 and 79 permits an operator to have the option of blocking flow between the cylinders 78 and 79 by simply closing the valve using any suitable lever control. The valve opening and closure may be effected through electrical means operating a solenoid-type valve 84. Such operator control of the buffering system, to freeze it and prevent swivel pivot motion for the rear axle 62, is desirable for stabilization purposes, especially in circumstances where implement loading or unloading operations are conducted with the frame carrying the implement at a highly articulated position with respect to the other frame. Freezing the buffering system also may be advantageous when the articulated equipment is being self-propelled between sites of working. If desired, swivel pivot motion of the rear axle may also be prevented by employing a lock arm arrangement at the rear axle comparable to that discussed above for lock arm 42X on the front axle 22 (FIG. 5).

Hydraulic lines 85 and 86 feeding into valve 84 are from a hydraulic fluid pressure source and feed back to a reservoir, and are for the purpose of replenishing hydraulic fluid for the operation of the buffering hydraulic system. Valve 84 suitably operates to close these lines during the buffering operation and during times of blocking cross flow between cylinders 78 and 79.

Now to be discussed is an optional structural means for the reactive adjustment system. The optional reactive adjustment system allows transverse swivel pivot movement of the axle 62 of the rear assembly (and also the rear frame) reactively to the lay of the terrain under the wheels of the rear assembly and independently of the pivot orientation of the front frame carrying the implement 10

A key feature of this optional structural means is that it is located at the articulation joint 50 of the tractor. Significantly, the optional structural means at the articulation joint may be used as the sole structural means for allowing transverse swivel pivot movement of the axle of the assembly not carrying the implement 10. In other words, the illustrated axle 62 of FIGS. 2 and 3 may be fixedly mounted to the frame 61, if desired; and the optional or alternative structural means of the reactive adjustment system may solely comprise the articulation joint transverse swivel pivot system. A reactive adjustment system at the articulation joint per se effectively allows transverse swivel pivot movement of a frame fixed axle reactively to the lay of the terrain under the wheels of the axle.

Figure 9:
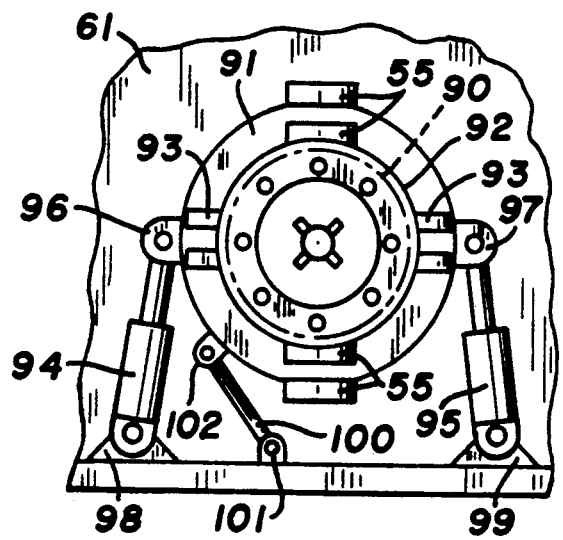
FIG. 9 is a schematic front elevation taken on line 9—9 of FIG. 8 (with the front assembly of the tractor removed), and illustrates the assembled relationship of elements forming the optional articulation joint swivel pivot between the rear and front assemblies of the tractor
Figure 8:
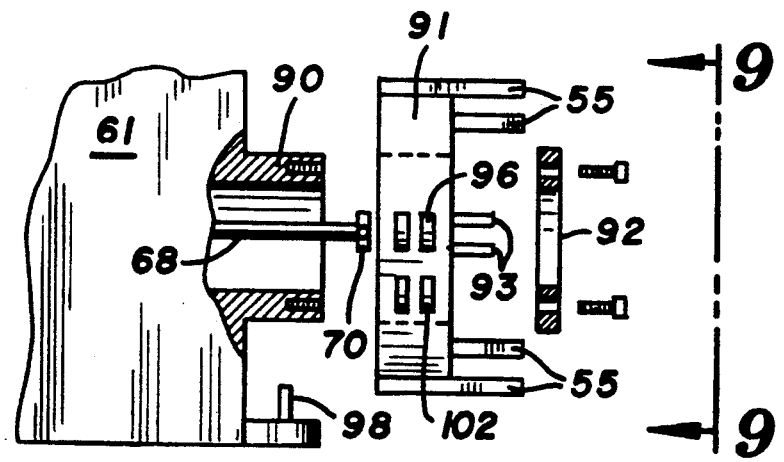
FIG. 8 is a schematic exploded side elevation o basic elements forming an alternative or optional structure for articulation joint transverse swivel pivot of the rear assembly of the tractor with the front assembly of the tractor omitted entirely.
Figure 10:
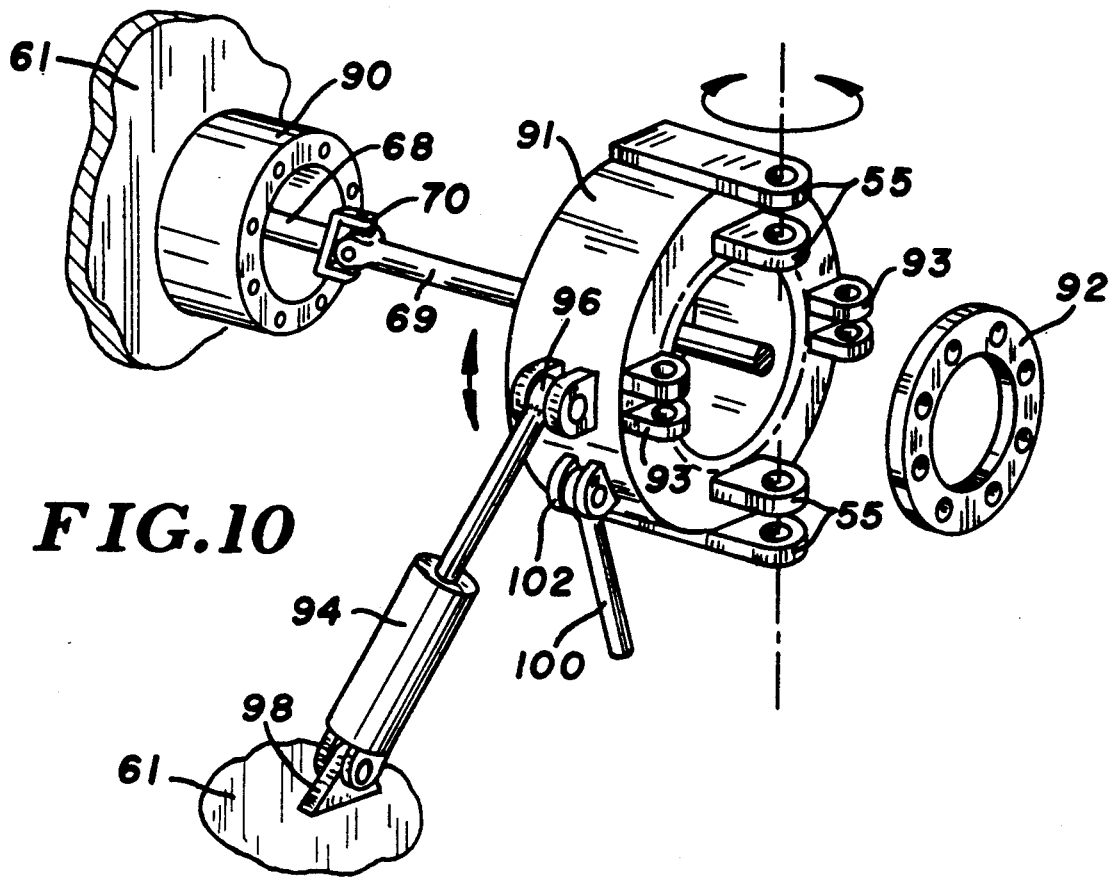
FIG. 10 is a schematic perspective view of the optional articulation joint swivel pivot structure formed of elements as illustrated in FIGS. 8 and 9.

The articulation joint transverse swivel pivot system is illustrated in FIGS. 8, 9 and 10, and allows transverse swivel pivot movement between the respective frames of the front and rear assemblies. Thus the torsional forces of tilt of one frame are not carried through to the other frame. Each frame can assume its own position of lateral tilt, regardless of the lateral tilt of the other frame, front or rear. This articulation joint transverse swivel pivot system comprises a pair of coupling members 90 and 91 coupled together for rotary movement relative to each other in a vertical plane transverse to the direction of travel of the tractor (i.e., transverse to the longitudinal extent of the tractor). The coupling members 90 and 91 suitably and illustratively are hub members coaxially coupled. Each hub member is in the nature of a circular band or ring, one member 91 having a greater internal diameter than the outer diameter of the other member 90 so as to permit coaxial alignment in a common radial plane.

One of the coupling hub members, suitably characterized as the first one 90, is immovably fixed to one of the frames of the tractor. As illustrated, the first hub member 90 is immovably fixed to the rear frame 61 of the tractor. The drive shaft 68 and its universal joint 70 extend through this first hub member, and the forward drive shaft 69 continues from the universal joint 70. The universal joint 70 is of course aligned with the articulation pivot 50.

The other or second coupling hub member 91 is immovably fixed to the articulation joint connector 5 for the same frame (e.g. rear frame 61) to which the first coupling member 9 is immovably fixed. The internal diameter of this second coupling member 91 is mounted for free rotation about the external diameter of the first coupling member 90. The ears 55 forming the articulation joint connector for the same frame (i.e., the rear frame to which the first coupling member is immovably fixed) project outwardly from the second coupling member and are adapted to receive the vertically oriented articulation pin means 56 (illustrated in FIG. 2). The ears 55 of the articulation joint connector in FIGS. 8, 9, and 10 correspond to the ears 55 of the articulation joint connector illustrated in FIG. 2. They link through the articulation joint pin means 56 to the ears 52 extending as the articulation joint connector from the front frame 21, as illustrated in FIG. 2.

Continuing with reference to FIGS. 8, 9, and 10, the first and second coupling hub members 90 and 91 are held in coaxial relationship by a retaining ring 92 fixed as by bolts to the first coupling hub member 90.

To be emphasized is the fact that the second coupling hub member 91, which forms part of the composite articulation joint and which carries the articulation joint connectors 55, is nonrotatable relative to the frame 21 of the front assembly 20. Whatever lateral tilt the front frame 21 takes is carried through the articulation joint to the second coupling hub member 91 and the second coupling member 91 takes the same tilt. The first hub member 90, being immovably fixed to the rear frame 61, however, does rotate and will vary in its rotary orientation depending on the transverse tilt orientation of the rear frame 61. The transverse tilt orientation of the rear frame 61, in the case of an axle 62 fixed immovably to the bottom of frame 61, would, therefore, be reactive (with axle 62) to the lay of the terrain under the wheels of the rear assembly 60. The axle 62 of the rear frame 61 would be swiveled or pivoted reactively to the lay of the terrain under the wheels of the rear frame 61 even if axle 62 were immovably fixed to rear frame 61.

Laterally positioned pairs of ears 93 on the side circumferential face surface of the second coupling hub member 91 are for pivot mounting of the articulation joint steering means. For example, one end of a hydraulic cylinder (such as that illustrated as 58 in FIGS. 2 and 3) is pivotally mounted to one pair of laterally spaced ears 93; and articulation joint steering is accomplished as previously described.

Buffering of the swivel rotary movement at the articulation joint is generally desirable The buffering for this is comparable to the buffering discussed above for the dampening of the transverse swivel pivot movement of the pivot-mounted axle 62 with respect to the frame 61 of the rear assembly (see FIGS. 2, 3 and 6). Illustratively, a pair of hydraulic cylinder and ram combinations 94 and 95 are mounted at one end to the opposing lateral sides of the second coupling member 91. This mounting on coupler 91 is a pivot mount 96 and 97. The opposite ends of the hydraulic cylinder and ram combinations 94 and 95 are pivotally mounted on ears 98 and 99 fixed on the frame 61 of the rear assembly. Thus, as the first coupling member rotatably moves with the frame (and axle) of the rear assembly, its rotary movement is dampened by the hydraulic cylinders. The dampening circuit for these hydraulic cylinders is identical to that illustrated in FIG. 11 for the dampening of the pivot movement for the pivotally mounted axle 62 with respect to frame 61 as previously discussed and illustrated in FIG. 11. Again, the valve 84 (see FIG. 11) may be closed by an operator to terminate or freeze dampening movement of the hydraulic cylinder combinations 94 and 95 mounted between the frame 61 of the rear assembly 60 and the second coupling member 91. Optionally, if desired, coupling members 90 and 91 may be locked against relative rotary movement by a removably mounted locking arm 100 extending between a mounting 101 on the rear frame 61 and a mounting 102 on the second coupling member 91. A locking arm 100 may desirably be placed in the illustrated position (see FIG. 10) for travel of the tractor between sites of working; it is removed when swivel pivot movement at the articulation joint is to be allowed In most instances, the reactive adjustment system to accommodate reactive swivel pivot movement of the axle of the assembly not carrying the implement 10 will either be the structure of the articulation joint transverse swivel pivot system just discussed or the swivel pivot mounting for the axle 62 relative to the frame 61 as discussed above. Normally both will not be used. However, within the broadest ambit of the invention it is contemplated that both could be employed in an articulation-steered tractor equipped with an implement orientation system in accordance with the teachings of the invention.

Figure 7:
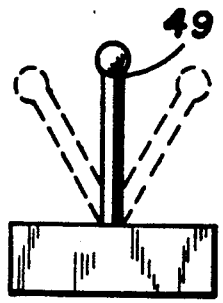
FIG. 7 is a schematic illustration of a control lever for operator control of the hydraulic means of FIG. 6.
Figure 11:
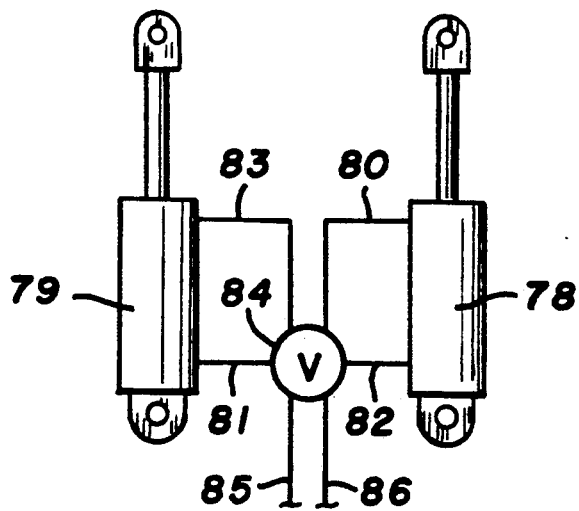
FIG. 11 is a schematic view of a buffering hydraulic system for swivel pivot systems for the assembly of the tractor not carrying the transverse implement.

As an alternative, the articulation joint swivel pivot structure may optionally be equipped with an operator-actuated power means for positively controlling the degree of swivel pivot at the articulation joint. This should be done in cases where the assembly not carrying the implement is designed to permit reactive swivel pivot of its axle with respect to its frame, but only to a restricted or limited degree. For example, a 15 degree axle-frame reactive swivel pivot may alone (without articulation swivel pivot) be insufficient to maintain reactive wheel-terrain contact on a 20 degree slope (as at 12 of FIG. 1) when the frame of the implement carrying assembly is oriented to be transversely level or horizontal. To put the problem into clear focus, let us assume that an articulation-steered tractor is formed without a reactive swivel pivot at its articulation joint. Let us also assume that the front assembly 20 of the tractor (the assembly carrying implement 10) is equipped with the positive adjustment system, all as illustrated and discussed for FIGS. 2 through 7, inclusive. Further, let us assume that the reactive adjustment system for the rear assembly 60 is that of the axle 62 pivotally mounted to frame 61, all as illustrated and discussed for FIGS. 2 and 3, with or without the buffering system as illustrated in FIG. 11. If the pivot mounting for axle 62 to frame 61 is limited for safety reasons to allow only 15 degrees of reactive swivel pivot movement, and if the wheels 62A and 62B for that axle are to be placed at upper and lower levels on a 20 degree slope while the frame 21 for the implement carrying assembly is maintained in a transversely horizontal orientation, then the lower of the wheels 62A or 62B will likely not be in support contact with the sloped terrain. Relaxation of the torsion between the front and rear tractor frames 61 and 21 is needed. That can be accomplished by using the articulation joint swivel pivot assembly of FIGS. 8, 9, and 10. However, since the axle 62 is mounted for reactive swivel pivot with respect to frame 61, a further purely reactive swivel pivot at the articulation joint tends to put frame 61 into a wobbly condition. Stability for the orientation of frame 61 becomes a problem. To overcome this problem and provide control over the orientation of frame 61 with respect to frame 21 when the articulation joint swivel pivot assembly is added, a manufacturer further adds an operator-actuated power means for positively controlling the degree of swivel pivot at the articulation joint. Illustratively, the hydraulic circuit of FIG. 6 is duplicated and used by the manufacturer to feed the hydraulic cylinder and ram combinations 94 and 95 of the articulation swivel pivot of FIGS. 8, 9 and 10. The degree of rotation between the coupling members 90 and 91 for the swivel pivot at the articulation joint is thereby placed under operator control, using a circuit such as illustrated in FIG. 6. This permits the operator to cause a predetermined degree of swivel pivot at the articulation joint, and to freeze or hold the condition of the articulation joint swivel by simply cutting off hydraulic input to the cylinders 94 and 95 (as by using a control lever such as illustrated in FIG. 7 to control the position of valve 48 in the FIG. 6 circuit). Therefore, in use, the operator actuates the duplicate of the hydraulic circuit of FIG. 6 for cylinders 94 and 95 and thereby effects a rotary pivot for coupling hub 91 to a degree sufficient to place both wheels 62A and 62B in support contact on the 20 degree slope, despite the 15 degree limit for the reactive swivel pivot between axle 62 and frame 61. The operator selected rotary pivot of coupling hub 91 with respect to coupling 90 may, for example, be about 10 degrees. This places the frame 61 at a 10 degree sloped relationship with respect to frame 21, which in turn allows the 15 degree swivel pivot between axle 62 and frame 61 to maintain terrain contact for both wheels 62A and 62B on the 20 degree slope.

It sometimes may be desired to fixedly adjust the transverse tilt of the axle of the frame not carrying the implement and then employ the articulation joint transverse swivel pivot system as essentially the sole structural means of the reactive adjustment system for reactive swivel pivot of that axle. Thus, the hydraulic (or equivalent) operator-actuated tilt adjustment means for setting the tilt between axle and frame a discussed for axle 22 and frame 21 (see FIGS. 2 through 7) may be duplicated for the axle 62 and frame 61. This permits an operator to fixedly adjust the tilt of axle 62 with respect to frame 61, leaving purely reactive swivel pivot for axle 62 governed by the articulation joint transverse swivel pivot system, with or without buffering of that system as previously discussed.

An articulation-steered tractor having features of the invention permits an operator to transversely tilt the scraper or blade or bucket of an implement 10 entirely at discretion independent of the slope of terrain under the wheels of the axle supporting the frame on which the implement is mounted. What this means to an operator is that the tilt of the frame of the assembly carrying the implement is entirely under operator control. It ma be tilted to the degree considered safe by an operator. If desired, maximum tilt limits may be set by design features for the elements that allow transverse tilt. Important to an operator, however, is the fact that transverse implement orientation may be positively varied as the tractor is moved along. Thus, a trench may be started with one edge of the implement digging into earth while the axle of the wheels for the implement-carrying assembly is sloped downwardly from the trench because of the terrain at the start of digging the trench. Then as the trench is gouged out, one of the wheels of the implement-carrying assembly may drop into the trench. Simultaneously the operator adjusts the transverse tilt of the frame carrying the implement with respect to the axle for that frame, so as to maintain the same trench depth and character even through terrain support for the wheels has undergone a change caused by digging the trench. Versatility of implement orientation for the frame-mounted implement, while simultaneously maintaining solid ground support for all wheels of the articulated tractor, despite the irregularity of the terrain, is thus provided by the unique combination of a positive adjustment system with a reactive adjustment system as described. The usefulness of these features is not limited to front end loader type articulated equipment and extends to scrapers and similar articulated equipment where the implement is carried ahead of the rear frame assembly towed from the articulation joint. It also extends to articulated equipment having leaning wheels. An important aspect of the invention is the positive and the reactive tilt features about the longitudinal axis, with the combination of positive and reactive tilt permitting highly efficient performance for a wide variety of grading, lifting, and carrying functions not believed heretofore to have been possible for articulated equipment.

Those skilled in the art will appreciate that many specific details of structure for accomplishing articulation as well as axle pivot movements and the articulation joint swivel pivot movement may vary without departing from the essential characteristics and features of the invention. Thus, the invention may be embodied in other specific forms than discussed and illustrated without departing from the spirit or essential characteristics of it. The illustrated embodiments are therefore to be considered in all respects illustrative and not restrictive, the scope of the invention being indicated by the appended claims rather than the foregoing description; and all changes that come within the meaning and range of equivalency of the claims are therefore intended to be embraced thereby.

That which is claimed is:

1. A self-propelled articulation-steered tractor equipped with an implement orientation system, said tractor having a front assembly and a rear assembly in longitudinal relationship, each said assembly comprising a frame having lateral dimensions and a transverse axle on laterally spaced wheels for supporting said frame, said tractor having a vertical-axis articulation pivot joint linking the frame of said rear assembly to the frame of said front assembly, articulation turning means for turning said front assembly relative to said rear assembly about said vertical-axis articulation joint to steer and tractor over terrain, a transverse implement mounted on the frame of one of said assemblies at a location in front of the axle thereof, and a positive adjustment system for controlling the orientation of said implement of said one assembly and a reactive adjustment system for allowing terrain-responsive orientation of the axle of the other said assembly;

i. said positive adjustment system comprising
    a. operator-actuated elevational means extending between said frame of said one assembly and said transverse implement for adjusting the vertical elevational orientation of said transverse implement with respect to the terrain,
    b. a medially located pivot mount structure fixed to the frame of said one assembly for mounting an axle thereto,
    c. a pivot mount at a medial location on said axle of said one assembly for mounting said axle in pivotable relationship to said pivot mount structure of said frame of said one assembly, and
    d. laterally positioned-actuated tilt adjustment means mounted between a lateral location on the frame of said one assembly and a location laterally spaced from said medial location on said axle of said one assembly, for adjusting the lateral pivot orientation of said frame of said one assembly with respect to said axle of said one assembly, to thereby adjust the transverse tilt of said transverse implement mounted on the frame of said one assembly with respect to the terrain,
  ii. said reactive adjustment system comprising structural means for allowing transverse swivel pivot movement of the axle of said other assembly reactively to the lay of the terrain under the wheels of said other assembly and independently of the pivot orientation of the frame of said one assembly, said reactive adjustment system being entirely separate from all elements of said positive adjustment system,
  iii. whereby said transverse implement is effectively adjustable in orientation as to both elevation and transverse tilt in a manner completely independent of the lay of variable terrain while said tractor is supported and is moved on its wheels over such terrain as well as in a manner completely independent of the swivel pivot orientation of the axle of said other assembly and in a manner completely and exclusively under the control of an operator, while at the same time maintaining all wheels of said articulation-steered tractor in supported relationship on the terrain even when the terrain is differently sloped under the wheels of said one assembly as compared to the other, iv. said tractor additionally including means for locking the axle of said one assembly against pivot movement with respect to the frame of said one assembly at an operator's discretion, said locking means comprising an arm member and means for fixing said arm member in rigid position between the frame of said one assembly and the axle of said one assembly at a location on each laterally spaced from said medially located pivot mount structure of said one assembly.

2. The tractor of claim 1 wherein said operator-actuated tilt adjustment means of said one assembly comprises hydraulic means.

3. The tractor of claim 1 wherein said structural means of said reactive adjustment system comprises a medially located pivot mount structure fixed to the frame of said other assembly for mounting thereto the axle of said other assembly, and a pivot mount at a medial location on said axle of said other assembly for mounting said axle in pivotal relationship to said pivot mount structure of said frame of said other assembly to thereby allow transverse swivel pivot movement of the axle of said other assembly with respect to said frame of said other assembly.

4. The tractor of claim 3 additionally comprising a buffering hydraulic system for dampening said transverse swivel pivot movement of the axle of said other assembly with respect to said frame of said other assembly, said buffering hydraulic system comprising two hydraulic cylinder and ram combinations having opposite ends, one said combination being on each lateral side of said medially located pivot mount structure of said other assembly, each said combination being pivotally linked at one end thereof to said axle of said other assembly and at the other end thereof to said frame of said other assembly, and conduit means interlinking the hydraulic cylinder of each said combination for cross flow of hydraulic fluid from one said hydraulic cylinder to the other as said axle of said other assembly pivots reactively to the lay of the terrain.

5. The tractor of claim 4 additionally comprising a valve in said conduit system, and means for an operator to close said valve to prevent said cross flow and thereby prevent transverse swivel pivot movement of the axle of said other assembly with respect to said frame of said other assembly.

6. A self-propelled articulation-steered tractor equipped with an implement orientation system, said tractor having a front assembly and a rear assembly in longitudinal relationship, each said assembly comprising a frame having lateral dimensions and a transverse axle on laterally spaced wheels for supporting said frame, said tractor having a vertical-axis articulation pivot joint linking the frame of said rear assembly to the frame of said front assembly, articulation turning means for turning said front assembly relative to said rear assembly about said vertical-axis articulation joint to steer said tractor over terrain, an articulation joint transverse swivel point system for transverse swivel point movement between the respective frames of said front and rear assemblies, a transverse implement mounted on the frame of one of said assemblies at a location in front of the axle thereof, and a positive adjustment system for controlling the orientation of said implement of said one assembly and a reactive adjustment system for allowing terrain-responsive orientation of the axle of the other said assembly;

i. said positive adjustment system comprising
 a. operator-actuated elevational means extending between said frame of said one assembly and said transverse implement for adjusting the vertical elevational orientation of said transverse implement with respect to the terrain,
 b. a medially located pivot mount structure fixed to the frame of said one assembly for mounting an axle thereto,
 c. a pivot mount at a medial location on said axle of said one assembly for mounting said axle in pivotable relationship to said pivot mount structure of said frame of said one assembly, and
 d. laterally positioned operator-actuated tilt adjustment means mounted between a lateral location on the frame of said one assembly and a location laterally spaced from said medial location on said axle of said one assembly, for adjusting the lateral pivot orientation of said frame of said one assembly with respect to said axle of said one assembly, to thereby adjust the transverse tilt of said transverse implement mounted on the frame of said one assembly with respect to the terrain, ii. said reactive adjustment system comprising structural means for allowing transverse swivel pivot movement of the axle of said other assembly reactively to the lay of the terrain under the wheels of said other assembly and independently of the pivot orientation of the frame of said one assembly, iii. whereby said transverse implement is effectively adjustable in orientation as to both elevation and transverse tilt in a manner completely independent of the lay of variable terrain while said tractor is supported and is moved on its wheels over such terrain as well as in a manner completely independent of the swivel pivot orientation of the axle of said other assembly and in a manner completely and exclusively under the control of an operator, while at the same time maintaining all wheels of said articulation-steered tractor in supported relationship on the terrain even when the terrain is differently sloped under the wheels of said one assembly as compared to the other.

7. The tractor of claim 6 wherein said articulation pivot joint comprises a connector extending from each said frame of said tractor, and wherein said articulation joint transverse swivel pivot system comprises first and second coupling members coupled together for relative rotary movement with respect to each other in a transverse vertical plane, said first coupling member being immovably fixed to one of said frames of said tractor, and said second coupling member being immovably fixed to the articulation joint connector for said one frame.

8. The tractor of claim 7 wherein each said coupling member comprises a hub member and wherein said hub members are coaxially coupled.

9. The tractor of claim 7 wherein said structural means of said reactive adjustment system comprises said articulation joint transverse swivel pivot system and additionally comprising buffer means extending between said one frame and said second coupling member for dampening the relative rotary movement between said first and second coupling members, said articulation joint transverse swivel pivot system being effective to allow transverse swivel pivot movement of the frame of said other assembly of said tractor and thus the axle of said other assembly in a manner reactively to the lay of the terrain under the wheels of said other assembly.

10. The tractor of claim 9 wherein said buffer means comprises a buffering hydraulic system, said buffering hydraulic system comprising two hydraulic cylinder and ram combinations having opposite ends, one said combination being on each lateral side of said coupling members, each said combination being pivotally linked at on end thereof to said one frame and at the other end thereof to said second coupling member, and conduit means interlinking the hydraulic cylinder of each said combination for cross flow of hydraulic fluid from one said hydraulic cylinder to the other as said relative rotary movement between said coupling members is effected by transverse swivel pivot movement of said frame of said other assembly with respect to said frame of said one assembly reactively to the lay of the terrain.

11. The tractor of claim 10 additionally comprising a valve in said conduit system, and means for an operator to close said valve to prevent said cross flow and thereby prevent said transverse swivel pivot movement of the frame of said other assembly with respect to said frame of said one assembly.

12. The tractor of claim 7 additionally including means for locking said coupling members against relative rotary movement with respect to each other, said locking means comprising an arm member and means for fixing said arm member in rigid position between said one frame and said second coupling member.

13. The tractor of claim 7 additionally including means for holding said coupling members in stable relationship against relative rotary movement with respect to each other.

14. The tractor of claim 7 additionally comprising operator-actuated power means extending between said one frame and said second coupling member for positively controlling the degree of the relative rotary movement between said first and second coupling members at an operator's discretion.

15. The tractor of claim 14 wherein said operator-actuated power means comprises a hydraulic cylinder and ram combination.

16. The tractor of claim 14 wherein said structural means of said reactive adjustment system consists essentially of a medially located pivot mount structure fixed to the frame of said other assembly for mounting thereto the axle of said other assembly, and a pivot mount at a medial location on said axle of said other assembly for mounting said axle in pivotal relationship to said pivot mount structure of said frame of said other assembly to thereby allow transverse swivel pivot movement of the axle of said other assembly with respect to said frame of said other assembly.

17. The tractor of claim 14 wherein said power means includes means for holding said coupling members in stable relationship against relative rotary movement with respect to each other.

18. The tractor of claim 7 wherein said structural means of said reactive adjustment system consists essentially of said articulation joint transverse swivel pivot system, and additionally comprising a medially located pivot mount structure fixed to the frame of said other assembly for mounting thereto the axle of said other assembly, a pivot mount at a medial location on said axle of said other assembly for mounting said axle in pivotal relationship to said pivot mount structure of said frame of said other assembly, and operator-actuated adjustment means mounted between a lateral location on the frame of said other assembly and a location laterally spaced from said medial location on said axle of said other assembly for fixedly adjusting the lateral pivot orientation of said frame of said other assembly with respect to said axle of said other assembly to a degree selected by an operator.

19. The tractor of claim 18 additionally comprising buffer means extending between said one frame and said second coupling member for dampening the relative rotary movement between said first and second coupling members, said articulation joint transverse swivel pivot system being effective to allow transverse swivel pivot movement of the frame of said other assembly of said tractor and thus the axle of said other assembly in a manner reactively to the lay of the terrain under the wheels of said other assembly.

20. The tractor of claim 6 wherein said structural means of said reactive adjustment system consists essentially of said articulation joint transverse swivel pivot system, and additionally comprising a medially located pivot mount structure fixed to the frame of said other assembly for mounting thereto the axle of said other assembly, a pivot mount at a medial location on said axle of said other assembly for mounting said axle in pivotal relationship to said pivot mount structure of said frame of said other assembly, and operator-actuated adjustment means mounted between a lateral location on the frame of said other assembly and a location laterally spaced from said medial location on said axle of said other assembly for fixedly adjusting the lateral pivot orientation of said frame of said other assembly with respect to said axle of said other assembly to a degree selected by an operator.

21. The tractor of claim 20 wherein said operator-actuated adjustment means for fixedly adjusting the lateral pivot orientation of said frame of said other assembly with respect to said axle of said other assembly comprises hydraulic means.

22. A self-propelled articulation-steered tractor equipped with an implement orientation system, said tractor having a front assembly and a rear assembly in longitudinal relationship, each said assembly comprising a frame having lateral dimensions and a transverse axle on laterally spaced wheels for supporting said frame, said tractor having a vertical-axis articulation pivot joint linking the frame of said rear assembly to the frame of said front assembly, articulation turning means for turning said front assembly relative to said rear assembly about said vertical-axis articulation joint to steer said tractor over terrain, a transverse implement mounted on the frame of one of said assemblies at a location in front of the axle thereof, and a positive adjustment system for controlling the orientation of said implement of said one assembly and a reactive adjustment system for allowing terrain-responsive orientation of the axle of the other said assembly:

i. said positive adjustment system comprising a. operator-actuated elevational means extending between said frame of said one assembly and said transverse implement for adjusting the vertical elevational orientation of said transverse implement with respect to the terrain, b. a medially located pivot mount structure fixed to the frame of said one assembly for mounting an axle thereto, c. a pivot mount at a medial location on said axle of said one assembly for mounting said axle in pivotable relationship to said pivot mount structure of said frame of said one assembly, and d. laterally positioned operator-actuated tilt adjustment means mounted between a lateral location on the frame of said one assembly and a location laterally spaced from said medial location on said axle of said one assembly, for adjusting the lateral pivot orientation of said frame of said one assembly, to thereby adjust the transverse tilt of said transverse implement mounted on the frame of said one assembly with respect to the terrain, ii. said reactive adjustment system comprising structural means for allowing transverse swivel pivot movement of the axle of said other assembly reactively to the lay of the terrain under the wheels of said other assembly and independently of the pivot orientation of the frame of said one assembly, iii. whereby said transverse implement is effectively adjustable in orientation as to both elevation and transverse tilt in a manner completely independent of the lay of variable terrain while said tractor is supported and is moved on its wheels over such terrain as well as in a manner completely independent of the swivel pivot orientation of the axle of said other assembly and in a manner completely and exclusively under the control of an operator, while at the same time maintaining all wheels of said articulation-steered tractor in supported relationship on the terrain even when the terrain is differently sloped under the wheels of said one assembly as compared to the other, iv. said tractor additionally including means for locking the axle of said one assembly against pivot movement with respect to the frame of said one assembly at an operator's discretion, said locking means comprising an arm member and means for fixing said arm member in rigid position between the frame of said one assembly and the axle of said one assembly at a location on each laterally spaced from said medially located pivot mount structure of said one assembly.

23. A self-propelled articulation-steered tractor comprising a front assembly and a rear assembly in longitudinal relationship, each said assembly comprising a frame having lateral dimensions, said tractor having a vertical-axis articulation pivot joint linking the frame of said rear assembly to the frame of said front assembly, an articulation joint transverse swivel pivot system for transverse swivel pivot movement between the frames of said front and rear assemblies, and operator-actuated power means mounted for positively controlling the transverse swivel pivot movement of said articulation joint transverse swivel pivot system at an operator's discretion.

24. The tractor of claim 23 additionally including a transverse implement mounted on the frame of one of said assemblies.

25. The tractor of claim 24 additionally including a positive adjustment system for controlling the orientation of said implement of said one assembly and a reactive adjustment system for allowing terrain-responsive orientation of the other said assembly.

26. The tractor of claim 23 wherein said articulation pivot joint comprises a connector extending from each said frame of said tractor, and wherein said articulation joint transverse swivel pivot system comprises first and second coupling members coupled together for relative rotary movement with respect to each other in a transverse vertical plane, said first coupling member being immovably fixed to one of said frames of said tractor, and said second coupling member being immovably fixed to the articulation joint connector for said one frame.

27. The tractor of claim 26 wherein each said coupling member comprises a hub member and wherein said hub members are coaxially coupled.

28. The tractor of claim 26 additionally including means for locking said coupling members against relative rotary movement with respect to each other, said locking means comprising an arm member and means for fixing said arm member in rigid position between said one frame and said second coupling member.

29. The tractor of claim 26 additionally including means for holding said coupling members in stable relationship against relative rotary movement with respect to each other.

30. The tractor of claim 26 wherein said power means is mounted between said one frame and said second coupling member.

31. A self-propelled articulation-steered tractor comprising a front assembly and a rear assembly in longitudinal relationship, each said assembly comprising a frame having lateral dimensions, and tractor having a vertical-axis articulation pivot joint linking the frame of said rear assembly to the frame of said front assembly, and an articulation joint transverse swivel pivot system for transverse swivel pivot movement between the frames of said front and rear assemblies, wherein said articulation pivot joint comprises a connector extending from each said frame of said tractor, and wherein said articulation joint transverse swivel pivot system comprises first and second coupling members coupling together for relative rotary movement with respect to each other in a transverse vertical plane, said first coupling member being immovably fixed to one of said frames of said tractor, and said second coupling member being immovably fixed to the articulation joint connector for said one frame, said tractor additionally including means for locking said coupling members against relative rotary movement with respect to each other, said locking means comprising an arm member and means for fixing said arm member in rigid position between said one frame and said second coupling member.

32. A self-propelled articulation-steered tractor comprising a front assembly and a rear assembly in longitudinal relationship, each said assembly comprising a frame having lateral dimensions, and tractor having a vertical-axis articulation pivot joint linking the frame of said rear assembly to the frame of said front assembly, and an articulation joint transverse swivel pivot system for transverse swivel pivot movement between the frames of said front and rear assemblies, wherein said articulation pivot joint comprises a connector extending from each said frame of said tractor, and wherein said articulation joint transverse swivel pivot system comprises first and second coupling members coupling together for relative rotary movement with respect to each other in a transverse vertical plane, said first coupling member being immovably fixed to one of said frames of said tractor, and said second coupling member being immovably fixed to the articulation joint connector for said one frame, said tractor additionally including means for holding said coupling means in stable relationship against relative rotary movement with respect to each other.

* * * * *

UNITED STATES PATENT AND TRADEMARK OFFICE
CERTIFICATE OF CORRECTION

PATENT NO.  :   5,180,028

DATED       :   Jan. 19, 1993

INVENTOR(S) :   Stephen A. Perrenoud, Jr.

It is certified that error appears in the above-identified patent and that said Letters Patent is hereby corrected as shown below:

Column 3, line 27, "o basic" should read:   --of basic--.

Column 5, line 21, read a period after "thereof".

Column 5, line 25, "feature" should read:   --features--.

Column 7, line 27, "implement a" should read:   --implement as--.

Column 8, line 27, read a period after "62".

Column 8, line 56, "o other" should read:   --or other--.

Column 9, line 68, read a period after "10".

Column 10, line 45, "connector 5" should read:   --connector 55--.

Column 10, line 47, "member 9" should read:   --member 90--.

Column 13, line 16, "a discussed" should read:   --as discussed--.

Column 13, line 31, "It ma" should read:   --It may--.

Claim 1, at column 14, line 28, "steer and" should read:   --steer said--.

Claim 1, at column 14, line 48, "positioned-actuated" should read:   --positioned operator-actuated--.

Claim 6, at column 16, line 3, "swivel point system" should read:   --swivel pivot system--.

Claim 6, at column 16, line 4, "point movement" should read:   --pivot movement--.

UNITED STATES PATENT AND TRADEMARK OFFICE
CERTIFICATE OF CORRECTION

PATENT NO. : 5,180,028  
DATED : Jan. 19, 1993  
INVENTOR(S) : Stephen A. Perrenoud, Jr.

PAGE 2 of 2

It is certified that error appears in the above-indentified patent and that said Letters Patent is hereby corrected as shown below:

Claim 22, at column 19, line 19, "assembly, to thereby" should read: --assembly with respect to said axle of said one assembly, to thereby--.

Claim 31, at column 20, line 36, "and tractor" should read: --said tractor--.

Claim 31, at column 20, line 45, "coupling members coupling" should read: --coupling members coupled--.

Claim 32, at column 20, line 60, "and tractor" should read: --said tractor--.

Claim 32, at column 21, line 1, "coupling members coupling" should read: --coupling members coupled--.

Signed and Sealed this

Twenty-fifth Day of January, 1994

Attest:

BRUCE LEHMAN

*Attesting Officer*  *Commissioner of Patents and Trademarks*